United States Patent [19]

Omura

[11] Patent Number: 5,072,272
[45] Date of Patent: Dec. 10, 1991

[54] SEMICONDUCTOR LIGHT MODULATOR WITH PN LAYERS

[75] Inventor: Etsuji Omura, Itami, Japan

[73] Assignee: Mitsubishi Denki Kabushiki Kaisha, Japan

[21] Appl. No.: 637,556

[22] Filed: Jan. 4, 1991

[30] Foreign Application Priority Data

Jan. 11, 1990 [JP] Japan .................................. 2-5650

[51] Int. Cl.[5] .......................................... H01L 27/14
[52] U.S. Cl. ...................................... 357/30; 357/19; 357/4; 357/16
[58] Field of Search ................ 357/30 E, 30 P, 30 R, 357/19, 4, 16, 88

[56] References Cited

U.S. PATENT DOCUMENTS

| | | | |
|---|---|---|---|
| 4,561,005 | 12/1985 | Shannon | 357/88 X |
| 4,590,507 | 5/1986 | Capasso et al. | 357/88 X |
| 4,833,511 | 5/1989 | Sugimoto | 357/19 |

FOREIGN PATENT DOCUMENTS 63-90180  4/1988  Japan .

OTHER PUBLICATIONS

Chemla, "Quantum Wells for Photonics", *Physics Today*, May 1985, pp. 57–64.
Wood et al., "High-Speed Optical Modulation with GaAs/GaAlAs Quantum Wells in a P-I-N Diode Structure", Appl. Phys. Lett. 44(1), 1 Jan. 1984, pp. 16–18.
Ackley et al., "GaAs Light-Emitting Dioides with N-I-P-I Active Layers Fabricated by Selective Contact Diffusion", *Appl. Phys. Lett.*, 53(2), 11 Jul., 1988, pp. 125–127.

*Primary Examiner*—Mintel William
*Attorney, Agent, or Firm*—Leydig, Voit & Mayer

[57] ABSTRACT

A semiconductor light modulator for modulating incident light of a particular wavelength according to the invention includes a plurality of successively disposed, alternating p and n conductivity type semiconductor layers, each layer having substantially the same index of refraction and a thickness approximately equal to one-fourth an integer multiple of the wavelength of light to be modulated divided by the index of refraction of the layer, a p-type region extending through the successively disposed layers, an n-type region extending through the successively disposed layers and spaced from the p-type region, a first electrode disposed on and in electrical contact with the p-type region, and a second electrode disposed on and in electrical contact with the n-type region.

6 Claims, 3 Drawing Sheets

SEMICONDUCTOR LIGHT MODULATOR WITH PN LAYERS

FIELD OF THE INVENTION

The present invention relates to a semiconductor device that modulates light transmitted through the device.

BACKGROUND OF THE INVENTION

Semiconductor devices that modulate transmitted light by passing the light through a multiple quantum well (MQW) structure are well known. An example is described in U.S. Pat. No. 4,833,511. In an MQW structure, relatively thin quantum well semiconductor layers are sandwiched between quantum barrier layers. The quantum barrier layers have larger energy band gaps than the quantum well layers. As a result, when the quantum well layers are sufficiently thin, typically ten nanometers or thinner, quantum mechanical effects are produced. Charge carriers can be confined to the wells and the population of excitons is increased significantly over bulk semiconductors. As a result, exciton resonances, alterations of effective band gaps, and other phenomena having quantum mechanical origins are produced. Some of these phenomena have been exploited in the known light modulators, including MQW structures.

FIG. 4 shows in schematic cross-section an MQW structure such as that used in known light modulators. Typically, these modulators have a pin-type structure including a p-type aluminum gallium arsenide (AlGaAs) layer 1 and an n-type AlGaAs layer 2 sandwiching the alternating quantum well and quantum barrier layers that form the MQW structure 3. Incoming light 4 passes through cladding layer 1, the MQW structure 3, where the modulation takes place, and out through cladding layer 2 as modulated light beam 5. As indicated in FIG. 4, the MQW structure 3 includes a plurality of pairs of quantum well layers 31 and quantum barrier layers 32. The reference numbers employed in FIG. 4 include a prefix indicating the type of layer, i.e., well or barrier, and a suffix indicating the respective layer pair. The structure of FIG. 3 includes fifty such pairs of well and barrier layers that are usually semi-insulating and each about ten nanometers in thickness. Thus, the MQW structure 3 is essentially an intrinsic-type body so that the light modulator has a pin structure. The incident and modulated light is generally perpendicular to the well and barrier layers 31 and 32.

The structure of FIG. 4 is typically prepared by growing the layers 31 and 32 by molecular beam epitaxy (MBE), metal organic chemical vapor deposition (MOCVD), or some other process that allows stringent control of layer thicknesses. Since each layer is only about twenty atomic layers thick, extremely precise process control is required to grow the alternating layers with the desired thicknesses.

Several light modulating mechanisms may be exploited with the MQW structure. An MQW structure is well known to exhibit one or more exciton resonances. At the wavelengths of those resonances, light absorption increases sharply. When the wavelength of the light being modulated is coincident with one of the exciton absorption peaks, a large portion of the incident 4 is absorbed and does not emerge from the modulator as light beam 5. The exciton absorption peaks shift in wavelength when the modulator structure of FIG. 4 is reverse-biased with an electrical voltage. With incident light 4 of a wavelength near the exciton absorption peak, variation of the reverse bias voltage applied across the structure varies the wavelength of the absorption peak and the degree of light absorption, thereby modulating the light beam 5 emerging from the modulator.

While the modulator of FIG. 4 is effective in modulating incident light of moderate intensity having a wavelength at the exciton absorption peak, the modulator is easily overloaded when the intensity of the incident light becomes too large. In that situation, only some of the incident light is modulated and the remainder of the light passes through the modulator without being modulated. Moreover, the precise wavelength of the exciton absorption peak varies not only with the bias voltage but also as a function of the temperature of the modulator, a temperature that can vary depending on the intensity of the incident light as well as the environmental temperature. The temperature dependence of the modulator can be mitigated, but not eliminated, by modulating light having a wavelength on the longer wavelength side of the exciton absorption peak.

In addition to exploitation of the exciton absorption phenomenon, the Quantum Stark Effect and inherent electro-optic effect of the semiconductor material may be exploited to modulate transmitted light. In both of these effects, the refractive index of the semiconductor materials is altered in response to the electric field produced in the modulator of FIG. 4 when an electrical signal is applied across layers 1 and 2. However, the degree of modulation achieved with these effects is relatively small, particularly since the thickness of the modulator through which the light transits is relatively small. If the thickness of the structure is increased to increase the effect of the refractive index change, an undesirable amount of the incident light is absorbed.

Accordingly, it is desirable to provide a semiconductor light modulator that produces a large degree of modulation of incident light, that is relatively free of temperature variations, that can modulate light of a desired wavelength not related to an exciton absorption peak, and that can be relatively easily produced, i.e., without the stringent process control required to produce an MQW structure.

SUMMARY OF THE INVENTION

It is an object of the present invention to provide a semiconductor light modulator producing a large degree of modulation of light transmitted through it, in which the degree of modulation is relatively independent of temperature, and that is relatively easy to produce without the stringent process controls required to produce an MQW structure.

A semiconductor light modulator for modulating incident light of a particular wavelength according to the invention includes a plurality of successively disposed, alternating p and n conductivity type semiconductor layers, each layer having substantially the same index of refraction and a thickness approximately equal to one-fourth an integer multiple of the wavelength of light to be modulated divided by the index of refraction of the semiconductor layers, a p-type region extending through the successively disposed layers, an n-type region extending through the successively disposed layers and spaced from the p-type region, a first electrode disposed on and in electrical contact with the p-type region, and a second electrode disposed on and in electrical contact with the n-type region.

In operation, a reverse electrical bias is applied across the first and second electrodes to alter the depletion regions that naturally occur at the junctions of the different conductivity type semiconductor layers. Because of the quarter wavelength thicknesses of the semiconductor layers, when the depletion regions at the junctions of the adjacent layers are altered by a bias voltage signal applied across the electrodes, the refractive index of the structure varies at intervals separated by integer multiples of quarter wavelengths. Thus, the modulator functions as a voltage controlled Bragg reflector in response to the reverse bias voltage signal, thereby modulating the light transmitted through it. A forward bias voltage may also be applied to modulate transmitted light due to the injection of electrons into the p-type layers and the resulting plasma effect.

Other objects and advantages of the present invention will become apparent from the detailed description given hereinafter. It should be understood, however, that the detailed description and specific embodiments are given by way of illustration only, since various changes and modifications within the spirit and scope of the invention will become apparent to those skilled in the art from the detailed description.

DETAILED DESCRIPTION OF THE PREFERRED EMBODIMENTS

Figure 1:
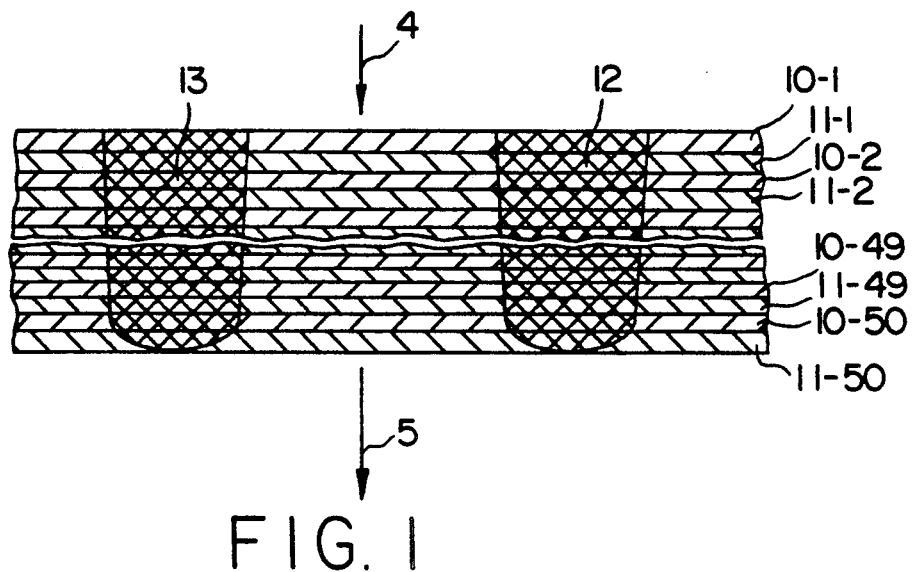
FIG. 1 is a schematic cross-sectional view showing a portion of a light modulator structure according to an embodiment of the invention.
Figure 4:
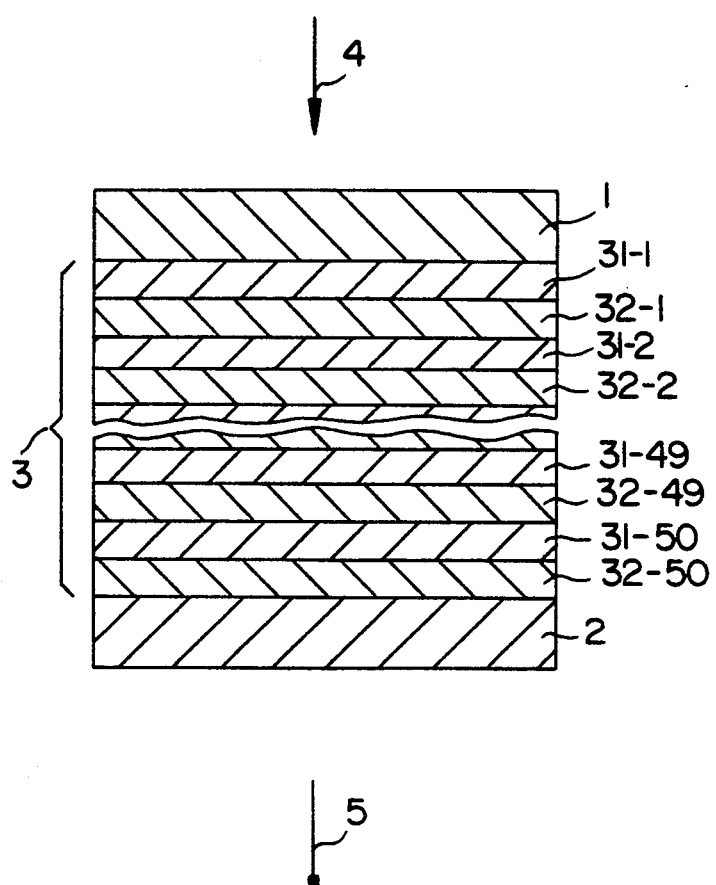
FIG. 4 is a schematic sectional view of a portion of a prior art light modulator.

FIG. 1 shows in cross-section important elements of a light modulator according to an embodiment of the invention. Like elements in all figures are given the same reference numbers. The modulator of FIG. 1 includes a plurality of pairs of semiconductor layers. Each layer is identified by a prefix indicating the layer conductivity type and a suffix indicating the layer pair. For example, all layers 10 may be p-type gallium arsenide (GaAs) and all layers 11 may be n-type GaAs. Each pair includes one layer 10 and one layer 11 of opposite conductivity types so that a junction is formed between them. Likewise, junctions are formed between adjacent layers of different pairs. In other words, one conductivity type junction is formed between layers 10-1 and 11-1, another conductivity type junction is formed between layers 11-1 and 10-2, still another conductivity type junction is formed between layers 10-2 and 11-2, and so forth. As in FIG. 4, incident light 4 enters one side of the successively disposed pairs of semiconductor layers and exits as modulated light beam 5 from the other side of the structure. The structure of FIG. 1 also includes a p-type region 12 that extends through the successively disposed layers and an n-type region 13 that also extends through the layers. Region 12 makes ohmic contacts to the p-type layers 10 and forms rectifying junctions with the n-type layers 11. Likewise, n-type region 13 forms ohmic contact with the n-type layers 11 and rectifying junctions with p-type layers 10. Unlike the MQW structure 3 of FIG. 4, the semiconductor layers 10-1, 11-1 . . . 10-50, 11-50 are all of the same composition so that heterojunctions, accompanying crystalline lattice mismatches, crystalline dislocations, and associated electrical defects, are not present to affect performance of the semiconductor device adversely.

An important feature of the invention lies in the thicknesses of the layers 10 and 11. Those thicknesses are "tuned" to integer multiples of one-quarter of the wavelength of the light to be modulated. For example, if the incident light 4 to be modulated has a wavelength of 900 nanometers in vacuum and the index of refraction of the semiconductor material of the layers is 3.00, then one-quarter wavelength of the light in the semiconductor layer is 75 nanometers. Most preferably, each of the semiconductor layers 10 and 11 has the same index of refraction. The indices of refraction of respective layers can be adjusted to some degree, if necessary, by controlling the charge carrier concentrations, i.e., doping levels in the layers, to make the indices of refraction of all of the layers substantially the same.

Figure 3A:
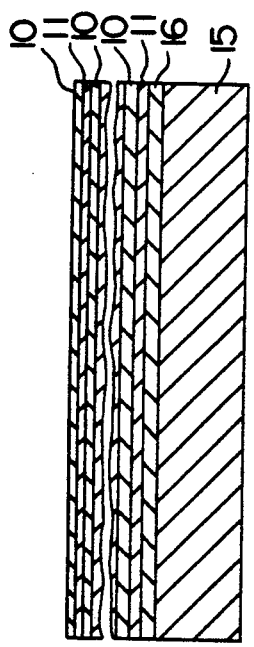
FIGS. 3(a)-3(c) are cross-sectional views illustrating a method for producing a light modulator according to the invention.
Figure 3B:
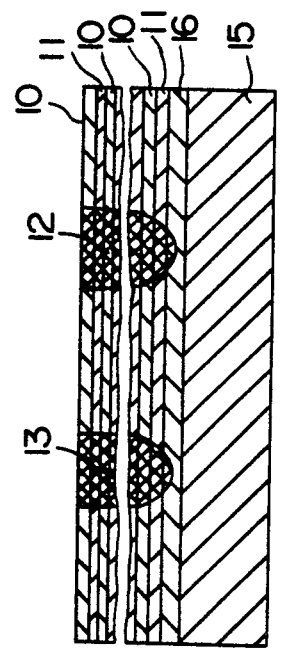
Figure 3C:
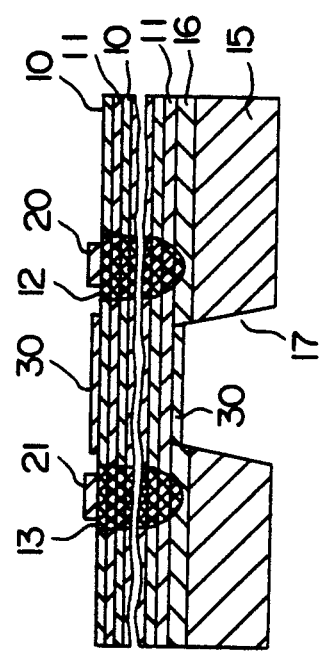

A complete embodiment of a light modulator according to the invention is shown in FIG. 3(c) and steps in making that modulator are illustrated in FIGS. 3(a)-3(c). In FIG. 3(a), a semi-insulating GaAs substrate 15 has grown upon it an $Al_xGa_{1-x}As$ etching stopping layer 16, where x equals 0.5. Thereafter, the pairs of layers 10 and 11 of alternating conductivity types are successively deposited on etching stopping layer 16. The etching stopping layer 16 and the pairs of layers 10 and 11 may be grown by known techniques such as MBE, MOCVD, and liquid phase epitaxy (LPE). As shown in FIG. 1, fifty pairs of layers 10 and 11 may typically be grown. As indicated in the foregoing example, those layers may each be about 75 nanometers in thickness depending upon the wavelength of the light to be modulated and the refractive indices of layers 10 and 11. That thickness is at least seven times the thickness of layers of corresponding materials in the MQW structure 3 of FIG. 4. Assuming the same percentage error in layer thicknesses may be tolerated in each structure, it is apparent that much less stringent control of growth conditions is needed in preparing the structure of FIG. 3(a) than in preparing an MQW structure. The concentrations of p-type and n-type dopant impurities in the layers 10 and 11 are controlled during the growth process to produce similar carrier concentrations in each of the layers and essentially the same refractive index. Typically, when the layers 10 and 11 are GaAs, the carrier concentration may be about $8 \times 10^{17}$ cm$^{-3}$. As well known in the art, GaAs can be doped n-type with silicon (Si) and p-type with beryllium (Be), magnesium (Mg), and zinc (Zn).

Turning to FIG. 3(b), the p-type region 12 and the n-type region 13, spaced apart from each other and penetrating the pairs of layers 10 and 11, are formed, for example, by ion implantation with a focused ion beam, by diffusion employing masks, or by other known techniques. Unlike an MQW structure where high temperature treatments threaten the integrity of the alternating quantum well and quantum barrier layers, in the invention, diffusion of impurities and annealing after ion implantation can be carried out without risk of destroying the essential structure of the modulator. Preferably, the spacing between the p-type region 12 and n-type region 13 is several microns. The cross-sectional views of FIGS. 1 and 3(c) suggest that the regions 12 and 13 are linear. However, those regions may have any shape in a plan view of the structure provided that the light beam 4 to be modulated can be incident on the device between the two regions.

The final steps in completing the modulator according to the invention are illustrated in FIG. 3(c). Preferably, a portion of the GaAs substrate 15 is removed by etching to avoid absorption of the modulated light in the substrate. That portion of the substrate may be removed by chemical etching employing an appropriate mask. The etchant is selected so that it etches GaAs but not AlGaAs. The etching stopping layer 16 limits the depth of etching and prevents damage to the pairs of layers 10 and 11 upon etching through the substrate. The partial removal of the substrate opens an aperture 17 through the substrate. First and second electrodes 20 and 21 are formed by conventional processes on and in electrical contact with regions 12 and 13, respectively. Finally, anti-reflection films 30 are deposited on the exposed layer 10 and in aperture 17 of the substrate 15 where incident light enters the device and modulated light emerges from the device, respectively.

When no bias is applied across the electrodes 12 and 13, the incident light 4 passes through the pairs of layers 10 and 11 and light absorption occurs in accordance with the characteristics of the material from which layers 10 and 11 are made. When a reverse bias voltage is applied across regions 12 and 13, i.e., with the positive side of the signal connected to region 13, the depletion regions at the junctions between each of layers 10 and 11 are altered. As a result, the light passes through a structure that includes, at quarter wavelength intervals (or at integer multiples of quarter wavelengths, depending upon the chosen thicknesses of the layers), refractive index variations. In other words, a path having relatively abrupt, periodic variations in refractive index is produced and those variations occur at intervals having a period of an integer multiple of one-quarter wavelength of the light to be modulated. Thus, a voltage controlled Bragg reflector structure is produced.

Bragg reflectors are well known in crystallography in which crystallographic planes of atoms constructively or destructively reflect x-rays of particular wavelengths depending upon the spacing of the planes. Crystallographic planes having a regular separation d constructively reflect normally incident x-rays for which an integer multiple of one-half wavelength equals d and destructively reflect, i.e., cancel, odd integer multiples of quarter wavelengths that equal d. This Bragg reflection phenomenon is exploited optically in the invention.

The voltage controlled Bragg reflector of the novel modulator has a period matched to the wavelength of incident electromagnetic radiation for destructive reflection of that incident radiation. The intensity of the reflections, i.e., the effectiveness of the destructive interference of the reflected light in the modulator, depends upon the amplitude of the electrical signal, i.e., the modulating signal, applied to electrodes 20 and 21 and thereby across regions 12 and 13, and the number of depletion regions, i.e., pairs of layers. The degree of modulation of the incident light is determined by the amplitude of the bias signal and the resulting carrier injection into the depletion region.

Figure 2:
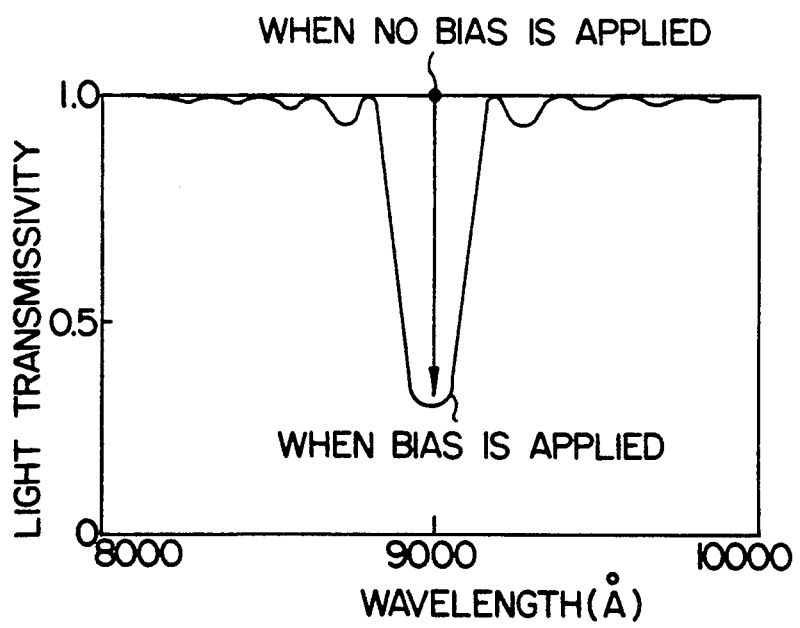
FIG. 2 is graph illustrating the modulation characteristics of a light modulator according to the invention.

The alteration of the depletion regions in a modulator structure according to the invention including fifty pairs of GaAs layers 10 and 11 decreases the effective refractive index from about 3.59 to about 3.50. This three percent change in refractive index reduces the transmissivity of the modulator structure to about three-tenths of the transmissivity when no bias signal is applied. The light transmission characteristic of this fifty layer pair structure as a function of wavelength is shown in FIG. 2. When no bias is applied to the structure, the light transmissivity, without respect to wavelength, is given a normalized value of 1.0. When a reverse bias voltage is applied, the light transmissivity varies as a function of wavelength, as shown in FIG. 2. The light transmissivity is the lowest at the wavelength corresponding to the quarter wavelength thicknesses of the layers 10 and 11. On either side of that wavelength, the transmissivity has a (sin x)/x characteristic variation as a function of wavelength.

When a forward bias voltage is applied across regions 12 and 13, i.e., with the positive side of the signal connected to region 12, electrons are injected into the p-type layers 10. The injected electrons form a plasma that lowers the refractive index of the p-type layers 10 by about one percent, thereby modulating the light passing through the structure in accordance with the amplitude of the forward bias signal.

In the invention, the stringent control of the growth process in forming an MQW structure is relaxed because the layers employed are much thicker than MQW layers and the light intensity saturation of the exciton absorption peak, observed when an MQW structure is employed, is absent. Therefore, a relatively large degree of modulation can be achieved without deterioration as the intensity of the modulated light increases. In addition, since the degree of modulation does not depend upon the separation between the wavelengths of the light modulated and a relatively sharp exciton absorption peak, the temperature dependence of the degree of modulation upon wavelength is reduced. In other words, better performance is achieved in a device that is more easily made than the MQW light modulating devices.

Although certain specific embodiments have been described in relation to the invention to explain its structure and operation, many changes can be made within the scope of the invention. The example of the invention shown in FIG. 3(c) includes fifty pairs of alternately doped semiconductor layers. The degree of modulation can be increased by increasing the number of pairs of layers. However, the number of pairs of layers employed in a device according to the invention may be fewer than fifty and a single layer, in addition to a plurality of pairs of layers, may be used in a structure according to the invention. Although the described embodiment of the invention uses the same materials for each of the layers 10 and 11 for simplicity of construction, different semiconductor materials may be employed for some or all of layers 10 and 11, respectively. In addition to GaAs, other semiconductor materials may be used for layers 10 and 11, such as AlGaAs, indium phosphide (InP), indium gallium arsenide phosphide (InGaP), Si, and germanium (Ge).

I claim:

1. A semiconductor light modulator for modulating incident light of a particular wavelength comprising:
a plurality of successively disposed, alternating p and n conductivity type semiconductor layers, each semiconductor layer having substantially the same index of refraction and a thickness approximately equal to an integer multiple of one-fourth of the wavelength of the light to be modulated divided by the index of refraction of the semiconductor layer;

a p-type region extending through the successively disposed layers;

an n-type region extending through the successively disposed layers and spaced from the p-type region;

a first electrode disposed on and in electrical contact with the p-type region; and a second electrode disposed on and in electrical contact with the n-type region.

2. The light modulator of claim 1 including a semiconductor substrate on which the plurality of semiconductor layers are disposed.

3. The light modulator of claim 2 wherein the substrate includes an aperture extending to the semiconductor layers for the passage of light.

4. The light modulator of claim 1 including at least one anti-reflection film disposed on the plurality of semiconductor layers for reducing light reflections at the layers.

5. The light modulator of claim 1 wherein the semiconductor layers are chosen from the group of semiconductors consisting of gallium arsenide, aluminum gallium arsenide, indium phosphide, indium gallium arsenide phosphide, silicon, and germanium.

6. The light modulator of claim 1 including at least fifty p-type layers and fifty n-type layers.

* * * * *